May 26, 1970 W. H. BROWN, JR 3,513,930
RESTRAINING DEVICE FOR MOTOR VEHICLE DRIVER
Filed Dec. 26, 1967
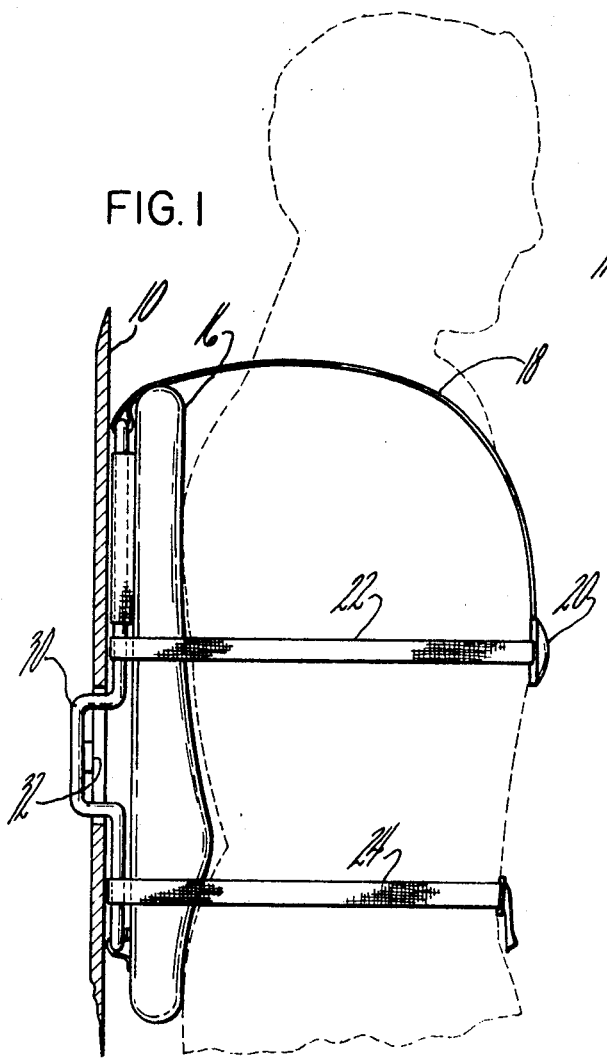
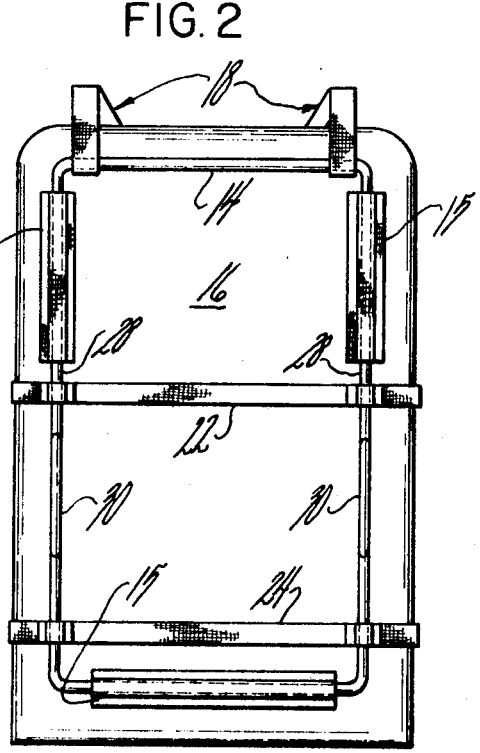
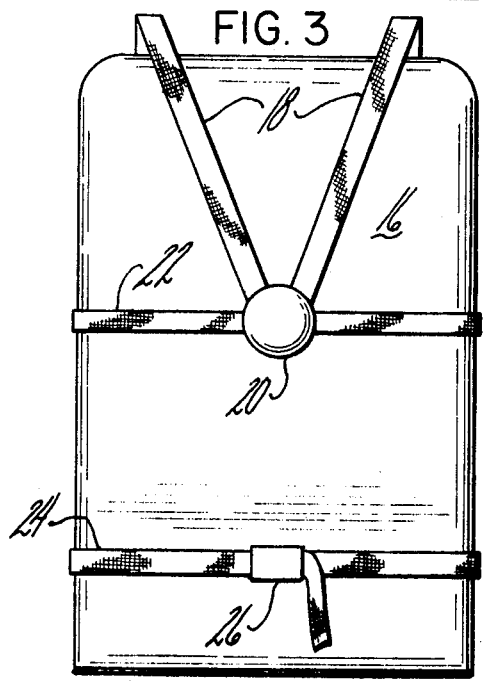
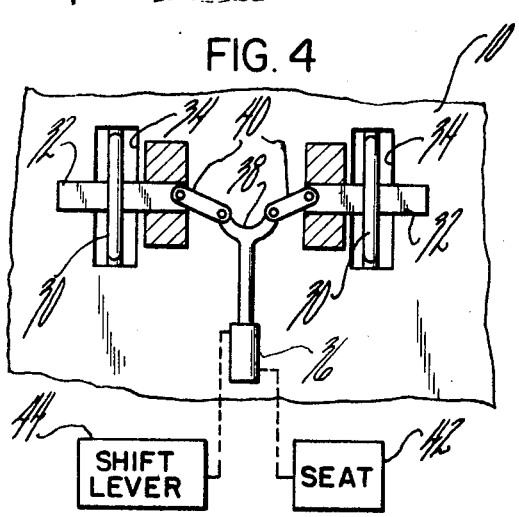
INVENTOR.
WILLIAM H. BROWN Jr
BY
*McCormick Paulding & Huber*
ATTORNEYS United States Patent Office 3,513,930
Patented May 26, 1970

3,513,930
RESTRAINING DEVICE FOR MOTOR VEHICLE DRIVER
William H. Brown, Jr., Suffield, Conn., assignor to Kaman Corporation, Bloomfield, Conn., a corporation of Connecticut
Filed Dec. 26, 1967, Ser. No. 693,555
Int. Cl. G60r 21/10
U.S. Cl. 180—82                10 Claims

ABSTRACT OF THE DISCLOSURE

A harness frame is worn on the driver's back, and has two readwardly protruding latch defining portions which are received in slots defined by a fixed bulkhead in the vehicle. An air motor behind the bulkhead moves bolts across these slots to releasably secure the frame to the bulkhead. The operation of the air motor is controlled by weight on the driver's seat of the vehicle for latching movement of the bolts and by moving the shift lever to "park" or "neutral" for releasing the bolts.

BACKGROUND OF INVENTION

Conventional lap type seatbelt installations have proven satisfactory for anchoring persons in a vehicle to a conventional vehicle seat. So too the harness type, over the shoulder strap sometimes used in motor vehicles has proven satisfactory for use in combination with a conventional vehicle seat.

However, in delivery type vehicles, particularly those having a pedestal type seat or in a vehicle such as a milk delivery truck wherein the driver frequently stands during operation of the vehicle, the lap type seatbelt and the over-the-shoulder harness have not proven satisfactory for several reasons. One reason can be attributed to the fact that such an operator must frequently mount and dismount his vehicle with the result that any safety belt installation is apt to be not used. Another disadvantage to the use of conventional safety belts in vehicles of the foregoing type can be attributed to the fact that the pedestal type seat, or lack thereon militates against convenient use of convenional safety belt hardware.

SUMMARY OF THE INVENTION

This invention relates generally to restraining systems for personnel riding in a moving vehicle, and deals more particularly with a restraining device including a harness which is worn by the vehicle operator. The vehicle includes a suitable latching mechanism for releasably securing the harness to a bulkhead in the vehicle when the vehicle is placed in forward motion.

The general object of the present invention is to provide a personnel restraining device which can be installed in motor vehicles not equipped with a conventional vehicle seat of the type commonly associated with lap type seat belts or over the shoulder harness strap installations.

BRIEF DESCRIPTION OF THE DRAWING

FIG. 1 is a side elevational view of a restraining device constructed in accordance with the present invention with the harness portion thereof being worn by a person outlined in broken lines.

FIG. 2 is a rear view of the harness portion of the device shown in FIG. 1.

FIG. 3 is a front view of the harness shown in FIG. 2, and

FIG. 4 is a somewhat schematic view of the latching mechanism provided on the rear side of the vehicle bulkhead generally opposite to the slot locations for receiving protruding latch portions of the harness.

DETAILED DESCRIPTION

Turning now to the drawing in greater detail, FIG. 1 shows a fixed bulkhead 10 of the motor vehicle (not shown) which bulkhead is located generally behind the station normally occupied by the operator of the vehicle indicated generally at 12. The operator 12 is fitted with a harness having a generally rectangular frame 14 to which a contoured back cushion 16 is attached by suitable means 15, 15 in order to isolate the operator 12 from the frame 14. The operator 12 is secured to the frame 14 by a pair of over the shoulder straps 18, 18 each of which is carried by a laterally extending upper strut portion of the frame 14 at one end and is connected to a quick release latch 20, of conventional construction at its other end. A restraining strap 22 is also receivable in the quick release mechanism 20 and extends around the operator's abdomen with means provided at the rear of the harness for securing the restraining strap 22 to the frame 14. A waist level restraining strap 24 is also provided with its own buckle assembly 26, and with end portions of the belt strap 24 carried by the tubular frame 14.

The frame 14 includes a pair of side-by-side vertically extending support portions 28, 28 connected to one another at their upper and lower ends by laterally extending strut portions to provide the enclosed frame best shown in FIG. 2. These vertically extending portions include latch defining U-shaped protrusions 30, 30 intermediate their upper and lower ends and as shown in FIG. 1, these rearwardly protruding latch defining portions define a laterally open receptacle behind the bulkhead 10 for receiving bolt elements 32, 32 best shown in FIG. 4. The bolt elements are slidably supported for lateral movement across slots 34, 34 defined in the bulkhead 10, and means is provided for moving the bolt elements simultaneously from and to the position shown in FIG. 4. As there shown the means for moving the bolt elements comprises a single fluid motor 36 having a reciprocable portion 38 connected by links 40, 40 to the bolt elements 32, 32 for this purpose.

Preferably, and as indicated schematically in FIG. 4, means is provided for moving the reciprocable portion 38 of the fluid motor 36 upwardly to latch the harness frame 14 in position against the bulkhead 10 in response to the weight of a person on the driver's seat as indicated schematically at 42. For releasing the bolt elements 32, 32, and returning the reciprocable portion 38 of the fluid motor, means is provided, as shown at 44, for retracting this reciprocable portion 38 in response to positioning of the conventional shift lever of the vehicle in "park" or "neutral."

The invention claimed is:
1. Personnel restraining device for use in a vehicle to releasably secure a person to the vehicle, said device comprising a harness adapted to be worn by the person and including a frame fitted to the person's back, said frame having at least one rearwardly protruding latch defining portion, and at least one bolt element slidably supported on a fixed generally vertically extending structure in the vehicle for movement across a slot in said structure, which slot receives said rearwardly protruding latch portion, and means for moving said bolt element across said slot.
2. The combination defined in claim 1 wherein said harness frame defines at least two side-by-side rearwardly protruding latch defining portions, and wherein two bolt elements are slidably mounted on said fixed structure for movement across two of said slots, and said means for moving said bolt elements comprising a single fluid motor having a reciprocable portion, and linkage means connecting said bolt elements to said reciprocable fluid motor portion.

3. The combination defined in claim 2 and further characterized by said fluid motor being adapted to be moved in one direction to latch said harness frame in response to the weight of a person on the driver's seat.

4. The combination defined in claim 3 and further characterized by said fluid motor being adapted to be moved in an opposite direction to release said harness frame in response to positioning the vehicle's shift lever.

5. The combination defined in claim 2 wherein said harness frame includes a pair of side-by-side vertically extending support portions and strut means for holding said support portions in laterally spaced relation, said rearwardly protruding latch portions comprising generally U-shaped protrusions of said support portions intermediate the upper and lower ends thereof, the space provided between the legs of said U-shaped protrusions comprising openings for said bolt elements.

6. Personnel restraining device for use in a vehicle to releasably secure a person to the vehicle, said device comprising a harness adapted to be worn by the person and including a frame fitted to the person's back, said frame having at least one rearwardly protruding latch defining portion, and bolt means carried by the vehicle for movement across the path of movement of said latch as a person with said harness thereon backs into a driving position in the vehicle.

7. The combination defined in claim 6 and further characterized by fluid motor means for moving said bolt means into and out of its latch engageable position.

8. The combination defined in claim 7 wherein said fluid motor is adapted to being moved in one direction to latch said harness in response to the weight of a person and in an opposite direction to release said harness in response to positioning of the vehicle's shift lever.

9. The combination defined in claim 6 wherein said harness frame defines at least two side-by-side rearwardly protruding latch defining portions, and wherein two bolt elements are slidably mounted on said fixed structure for movement across two of said slots, and said means for moving said bolt elements comprising a single fluid motor having a reciprocable portion, and linkage means connecting said bolt elements to said reciprocable fluid motor portion.

10. The combination defined in claim 9 wherein said harness frame includes a pair of side-by-side vertically extending support portions and strut means for holding said support portions in laterally spaced relation, said rearwardly protruding latch portions comprising generally U-shaped protrusions of said support portions intermediate the upper and lower ends thereof, the space provided between the legs of said U-shaped protrusions comprising openings for said bolt elements.

References Cited

UNITED STATES PATENTS

| | | | |
|---|---|---|---|
| 2,442,375 | 6/1948 | Paxton | 297—4 X |
| 2,754,073 | 7/1956 | Holm et al. | 297—385 X |
| 2,833,343 | 5/1958 | Benson | 280—150 X |
| 2,876,829 | 3/1959 | Johnson | 297—389 X |
| 3,215,220 | 11/1965 | Schoeffler | 297—385 X |
| 3,226,674 | 12/1965 | Eriksson. | |
| 3,301,594 | 1/1967 | Pukish | 297—389 |
| 3,385,633 | 5/1968 | Aizley | 297—385 X |

KENNETH H. BETTS, Primary Examiner

U.S. Cl. X.R.

180—101; 297—385; 280—150